(12) United States Patent
Kim

(10) Patent No.: US 11,075,433 B2
(45) Date of Patent: Jul. 27, 2021

(54) RECHARGEABLE BATTERY INCLUDING AN OVERCHARGE SAFETY DEVICE

(71) Applicant: Samsung SDI Co., Ltd., Yongin-si (KR)

(72) Inventor: Joonghun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 152 days.

(21) Appl. No.: 16/343,674

(22) PCT Filed: Oct. 18, 2017

(86) PCT No.: PCT/KR2017/011540
§ 371 (c)(1),
(2) Date: Apr. 19, 2019

(87) PCT Pub. No.: WO2018/074846
PCT Pub. Date: Apr. 26, 2018

(65) Prior Publication Data
US 2020/0058919 A1 Feb. 20, 2020

(30) Foreign Application Priority Data
Oct. 21, 2016 (KR) .................. 10-2016-0137737

(51) Int. Cl.
*H01M 50/578* (2021.01)
*H01M 50/172* (2021.01)
*H01M 50/581* (2021.01)

(52) U.S. Cl.
CPC ....... *H01M 50/578* (2021.01); *H01M 50/172* (2021.01); *H01M 50/581* (2021.01); *H01M 2200/10* (2013.01); *H01M 2200/20* (2013.01)

(58) Field of Classification Search
CPC ........ H01M 2/345; H01M 2/06; H01M 2/348; H01M 2200/10; H01M 2200/20;
(Continued)

(56) References Cited

U.S. PATENT DOCUMENTS 9,444,088 B2 * 9/2016 Yang .................. H02H 3/087
2003/0113614 A1 * 6/2003 Romero ............ H01M 10/4235
429/61

(Continued)

FOREIGN PATENT DOCUMENTS

JP 5727090 B2 6/2015
JP 5859149 B2 2/2016
(Continued)

*Primary Examiner* — Wyatt P McConnell
(74) *Attorney, Agent, or Firm* — Lewis Roca Rothgerber Christie LLP

(57) ABSTRACT

An exemplary embodiment of the present invention provides a rechargeable battery that can block a current of a cell without causing quality scatter by removing operating scatter of the overcharge safety device upon occurrence of overcharge in the cell.

An overcharge safety device according to an exemplary embodiment of the present invention includes: an electrode assembly in which a first electrode and a second electrode are disposed at opposite sides of a separator; a case in which the electrode assembly is accommodated; a cap plate that is combined to an opening of the case; a first electrode terminal and a second electrode terminal that are provided in terminal holes of the cap plate and respectively connected to the first electrode and the second electrode; and an overcharge safety device in which a first free end and a second free end of a first short-circuit member and a second short-circuit member that are respectively connected to the first electrode terminal and the second electrode terminal in the cap plane are disposed apart from each other and received in a tube.

15 Claims, 13 Drawing Sheets

(58) Field of Classification Search
CPC .......... H01M 2/34; H01M 2/30; H01M 10/04; H01M 2/022; H01M 10/0422; Y02E 60/10
See application file for complete search history.

(56) References Cited

U.S. PATENT DOCUMENTS

| | | |
|---|---|---|
| 2004/0096732 A1* | 5/2004 | Shin .................... H01M 2/0277 429/61 |
| 2010/0047674 A1* | 2/2010 | Ryu ........................ H01M 2/34 429/62 |
| 2010/0266879 A1 | 10/2010 | Byun et al. |
| 2011/0200849 A1 | 8/2011 | Byun et al. |
| 2014/0170449 A1 | 6/2014 | Takahashi et al. |
| 2014/0170450 A1 | 6/2014 | Takahashi et al. |
| 2015/0104674 A1 | 4/2015 | Han et al. |
| 2015/0180013 A1* | 6/2015 | Ahn ...................... H01M 2/305 429/178 |
| 2015/0270529 A1 | 9/2015 | Guen et al. |
| 2016/0133995 A1* | 5/2016 | Hattori .............. H01M 10/0566 429/61 |

FOREIGN PATENT DOCUMENTS

| | | |
|---|---|---|
| KR | 10-2010-0116028 A | 10/2010 |
| KR | 10-2011-0095101 A | 8/2011 |
| KR | 10-2014-0042269 A | 4/2014 |
| KR | 10-2015-0109671 A | 10/2015 |

* cited by examiner

RECHARGEABLE BATTERY INCLUDING AN OVERCHARGE SAFETY DEVICE

CROSS-REFERENCE TO RELATED APPLICATION(S)

This application is a National Phase Patent Application of International Patent Application Number PCT/KR2017/011540, filed on Oct. 18, 2017, which claims priority of Korean Patent Application No. 10-2016-0137737, filed Oct. 21, 2016. The entire contents of both of which are incorporated herein by reference.

TECHNICAL FIELD

The present invention relates to a rechargeable battery. More particularly, the present invention relates to a rechargeable battery in which an overcharge safety device is activated in an overcharge state in an internal space of a cell.

BACKGROUND ART

A rechargeable battery is a battery that repeatedly performs charging and discharging, differently from a primary battery. A rechargeable battery with small capacity is used in a small portable electronic device, such as a mobile phone, a notebook computer, and a camcorder, and a rechargeable battery with large capacity may be used as a motor driving power source for a hybrid vehicle and an electric vehicle.

For example, rechargeable batteries include an electrode assembly for charging and discharging, a case accommodating the electrode assembly and an electrolyte solution, a cap plate coupled to the opening of the case, and an electrode terminal that electrically connects the electrode assembly to draw out the electrode assembly to the outside of the cap plate.

In addition, the rechargeable battery includes an overcharge safety device for overcharge control. The overcharge safety device includes a short-circuit tab and a short-circuit member that is separated or short-circuited according to an internal pressure. The short-circuit tab is electrically connected to a negative electrode, and the short-circuit member is electrically connected to a positive electrode.

When a cell is overcharged, the short-circuit member is inverted and thus contacts the short-circuit tab, thereby causing discharge of a current charged in the electrode assembly. In this case, an inversion shape of the short-circuit member may not be constant. Accordingly, contact area scatter occurs from a contact surface of the short-circuit member and the short-circuit tab, thereby causing generation of resistance scatter from the contact surface. That is, the overcharge safety device cannot effectively control overcharge of the rechargeable battery, thereby generating quality scatter.

DISCLOSURE

Technical Problem

An exemplary embodiment of the present invention has been made in an effort to provide a rechargeable battery that can block a current of a cell without causing quality scatter by removing operating scatter of the overcharge safety device upon occurrence of overcharge in the cell. In addition, an exemplary embodiment of the present invention provides a rechargeable battery that includes an overcharge safety device that is not influenced by a cell manufacturing process and does not cause operating scatter.

Technical Solution

An overcharge safety device according to an exemplary embodiment of the present invention includes: an electrode assembly in which a first electrode and a second electrode are disposed at opposite sides of a separator; a case in which the electrode assembly is accommodated; a cap plate that is combined to an opening of the case; a first electrode terminal and a second electrode terminal that are provided in terminal holes of the cap plate and respectively connected to the first electrode and the second electrode; and an overcharge safety device in which a first free end and a second free end of a first short-circuit member and a second short-circuit member that are respectively connected to the first electrode terminal and the second electrode terminal in the cap plane are disposed apart from each other and received in a tube.

The overcharge safety device may further include holders that seal a first fixing portion and a second fixing portion at predetermined locations from the first free end and the second free end in the first short-circuit member and the second short-circuit member that are combined to opposite ends of the tube and extend to the inside of the tube.

The tube may be provided as a compression tube that contracts by an internal pressure increase due to a gas generated from an internal space set by the cap plate and the case upon overcharge such that the first free end and the second free end contact each other.

The tube may be provided as a heat-shrink tube that contracts by an internal heat increase generated from an internal space set by the cap plate and the case upon overcharge such that the first free end and the second free end contact each other.

The tube may be provided as a compression/heat-shrink tube that contracts by an internal pressure increase and an internal heat increase due to a gas generated from an internal space set by the cap plate and the case upon overcharge such that the first free end and the second free end contact each other.

The first short-circuit member and the second short-circuit member may extend to a predetermined length with a width and a thickness.

The first short-circuit member and the second short-circuit member may be bent between the holder and the first electrode terminal and between the holder and the second electrode terminal, and may be connected to the first electrode terminal and the second electrode terminal through a wide area of a first connection end portion and a wide area of a second connection end portion.

The first free end and the second free end may be disposed opposing each other at a distance from each other in a direction that crosses a plane of the cap plate in the case, and the first connection end portion and the second connection end portion may be connected with the first electrode terminal and the second electrode terminal in a surface-contact manner in a width direction of the cap plate in the case.

When the first free end and the second free end that are activated upon overcharge and surface-contact each other may have the same width as a fixing width of the first fixing portion and a fixing width of the second fixing portion that are fixed to the holders.

The first free end and the second free end that are activated upon overcharge and surface-contact each other may have a first width W1 that is larger than a second width W2 of the first fixing portion and the second fixing portion fixed to the holders.

The first free end and the second free end may surface-contact each other with an area having a predetermined length and the first width.

The first fixing portion and the second fixing portion may be fixed to the holders with the second width.

The first free end and the second free end may curve-contact each other with an area having a predetermined length and the first width.

The first fixing portion and the second fixing portion may be connected as planes to the first free end and the second free end, which are curved, and fixed to the holders with the second width.

The second electrode terminal may be connected to an uncoated region tab of the second electrode through an inner side end thereof and is connected to the second short-circuit member at an upper portion of the uncoated region tab, and the second electrode terminal may further include a fuse that is formed between the uncoated region tab and the second short-circuit member.

Advantageous Effects

As described above, according to the one embodiment of the present invention, since the overcharge safety device formed inside the tube that contacts the first short-circuit member and the second short-circuit member which are separated from each other is provided inside the cap plate, operating scatter of the overcharge safety device can be removed and a current of a cell can be blocked without quality scatter upon overcharge.

The overcharge safety device according to the exemplary embodiment can be separately manufactured from the cell and is connected with the first and second electrode terminals inside the cap plate, and thus the device is not influenced by a manufacturing process of the cell, and a current of the cell can be blocked without causing operating scatter upon overcharge.

MODE FOR INVENTION

Figure 1:
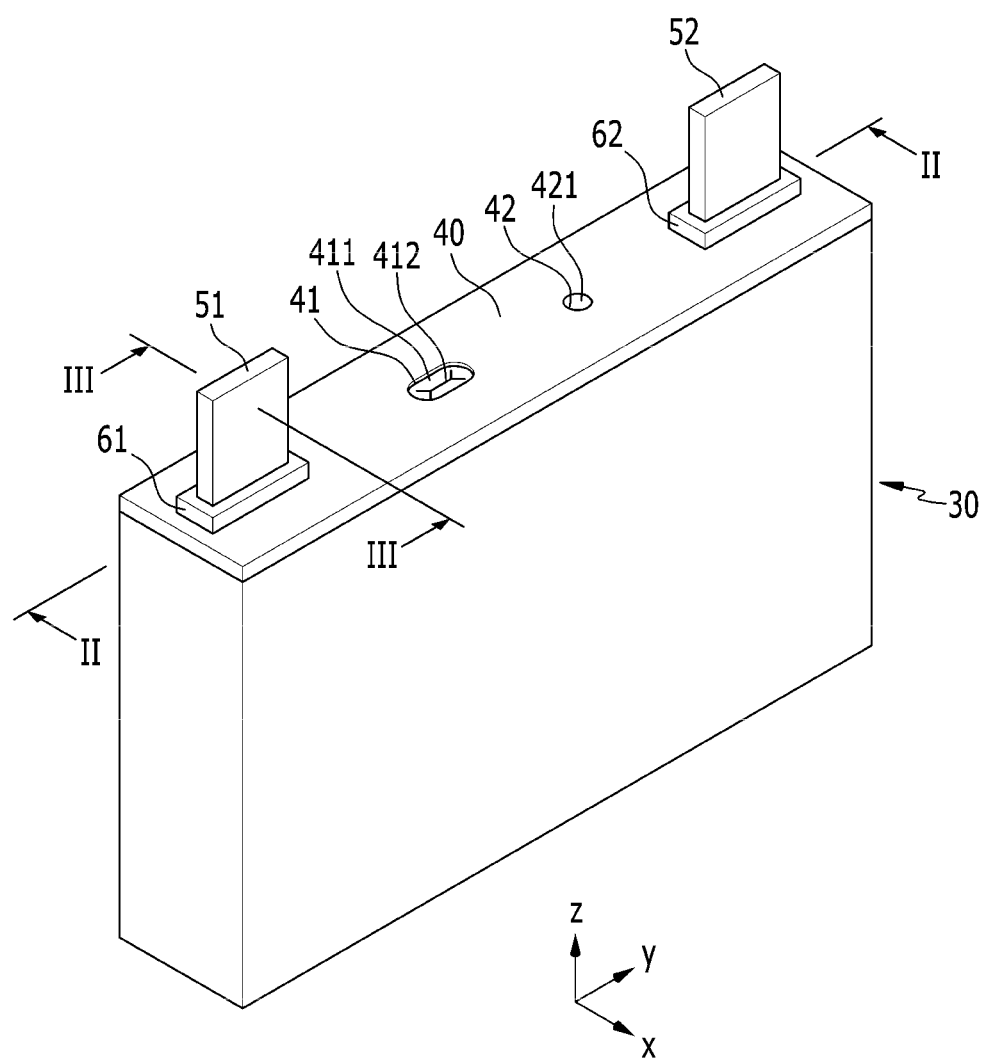
FIG. 1 is a perspective view of a rechargeable battery according to a first exemplary embodiment of the present invention.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

It will be understood that when an element such as a layer, film, region, or substrate is referred to as being "on" another element, it can be directly on the other element or intervening elements may also be present. Throughout the specification, the word "on" means positioning on or below the object portion, but does not essentially mean positioning on the upper side of the object portion based on a gravitational direction.

Figure 2:
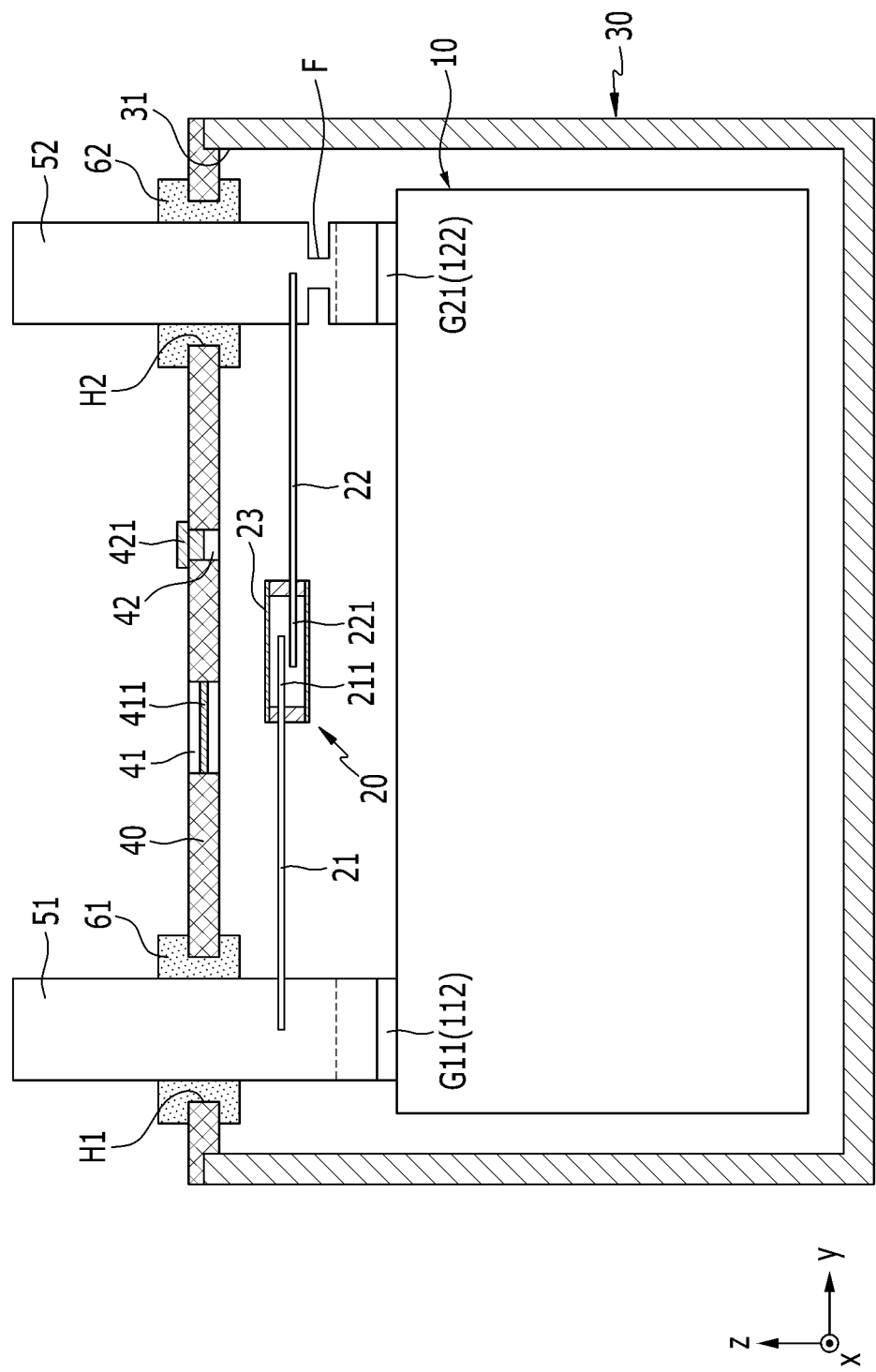
FIG. 2 is a cross-sectional view of FIG. 1, taken along the line II-II.
Figure 3:
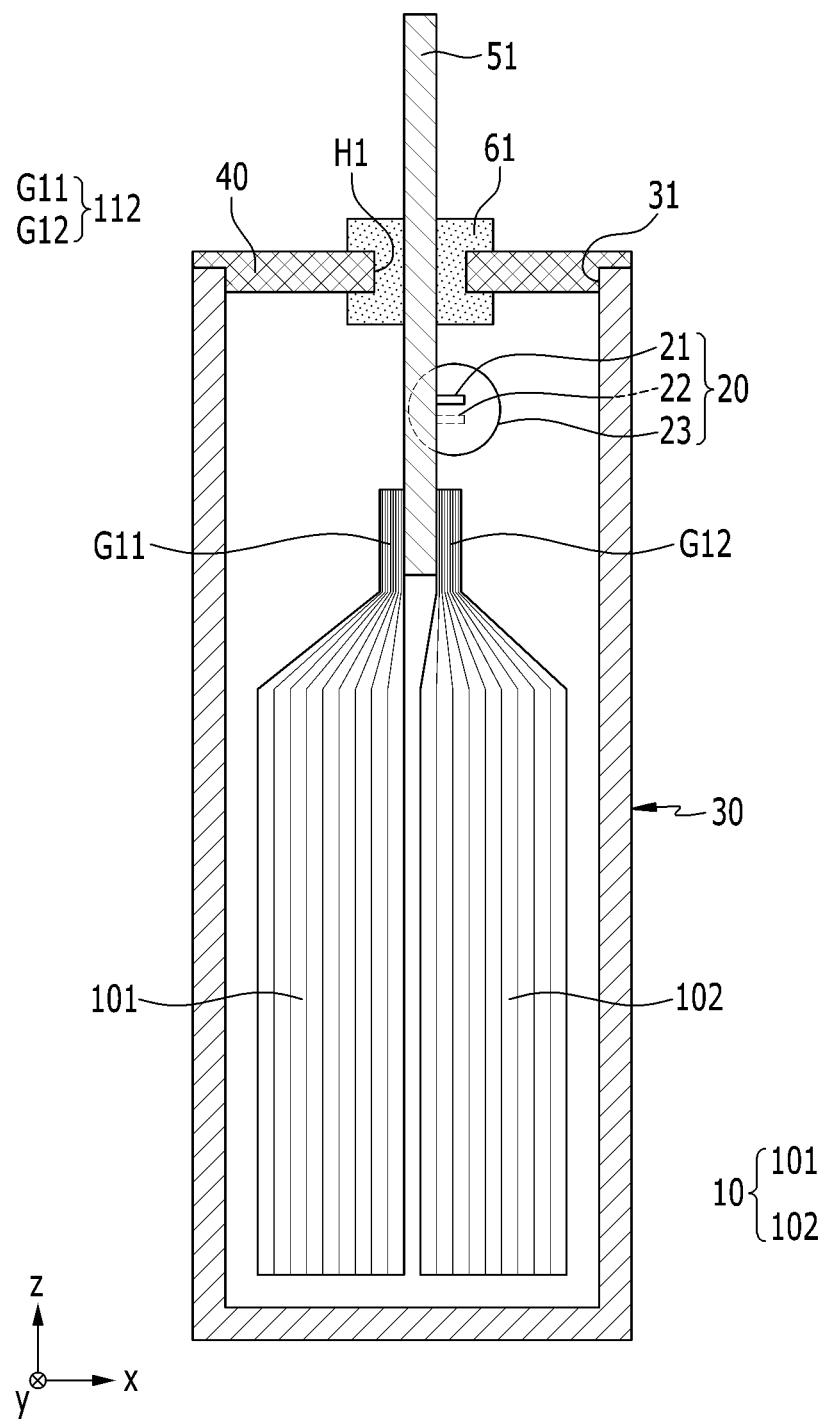
FIG. 3 is a cross-sectional view of FIG. 1, taken along the line III-III.

FIG. 1 is a perspective view of a rechargeable battery according to a first exemplary embodiment of the present invention, FIG. 2 is a cross-sectional view of FIG. 1, taken along the line II-II, and FIG. 3 is a cross-sectional view of FIG. 1, taken along the line III-IIII.

Referring to FIG. 1 to FIG. 3, a rechargeable battery according to the first exemplary embodiment includes an electrode assembly 10 that charges and discharges a current, a case 30 in which the electrode assembly 10 and an electrolyte solution are embedded, a cap plate 40 that is combined to an opening 31 of the case 30 to close and seal the opening 31, first and second electrode terminals 51 and 52 that are electrically connected to the electrode assembly 10 and thus installed in the cap plate 40, and an overcharge safety device 20 that is activated when there is an overcharge.

Although it is not illustrated, the rechargeable battery may further include a top insulator that is formed of an electric insulating material. The top insulator is disposed between an inner surface of the cap plate 40 and the electrode assembly 10 for electrical insulation therebetween.

The case 30 sets a space for accommodating a plate-shaped electrode assembly 10 and the electrolyte solution.

For example, the case 30 is formed in a substantially rectangular parallelepiped shape, and a quadrangular-shaped opening 31 is provided at one side thereof through which the electrode assembly 10 is inserted. The case 30 and the cap plate 40 may be made of, for example, aluminum, and thus they may be combined to each other and then welded at the opening 31.

The cap plate 40 further includes not only terminal holes H1 and H2 where the first and second electrode terminals 51 and 52, are installed but also a vent hole 41 and an electrolyte injection opening 42. The vent hole 41 is closed and sealed by a vent plate 411 such that an internal pressure that is increased due to a gas generated from the rechargeable battery due to charging and discharging of the electrode assembly 10 can be discharged to the outside. The vent plate 411 includes a notch 412 that induces a rupture.

The electrolyte injection opening 42 allows the cap plate 40 and the case 30 to be injected with the electrolyte after the cap plate 40 is welded to the case 30. After injection of the electrolyte solution, the electrolyte injection opening 42 is sealed by a sealing cap 421.

Figure 4:
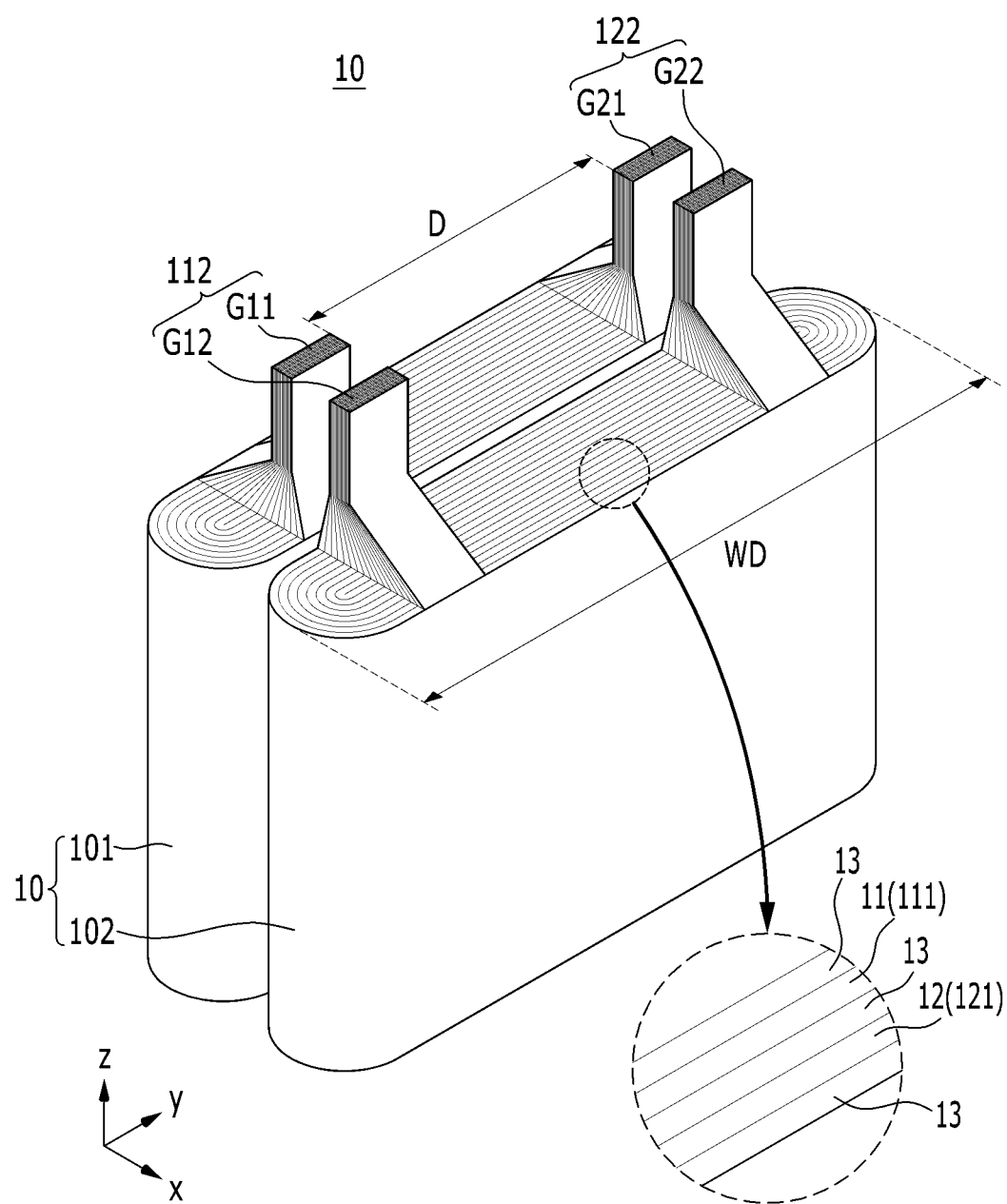
FIG. 4 is a perspective view of an electrode assembly applied to FIG. 3.

FIG. 4 is a perspective view of the electrode assembly applied to FIG. 3. Referring to FIG. 2 to FIG. 4, the electrode assembly 10 is formed by disposing a first electrode 11 (e.g., a negative electrode) and a second electrode 12 (e.g., a positive electrode) at opposite sides of a separator 13, which is an electrical insulator.

For example, the negative electrode 11, the separator 13, and the positive electrode 12 may be spiral-wound. Although it is not illustrated, the negative electrode, the separator, and the positive electrode are stacked such that an electrode assembly can be formed.

The negative and positive electrodes 11 and 12 respectively include coated regions 111 and 121, where an active material is coated on a current corrector made of a metal thin film (e.g., Cu, Al foil), and uncoated region tabs 112 and 122, where the current collector is not coated with an active material and thus is exposed. The uncoated region tabs 112 and 122 are disposed at one end of the spiral-wound electrode assembly 10, while having a distance D within one spiral-winding range WD of the electrode assembly 10.

That is, the uncoated region tabs 112 of the negative electrode 11 are disposed at one side (i.e., the left side of FIG. 4) in one end (i.e., an upper end of FIG. 4) of the spiral-wound electrode assembly 10, and the uncoated region tabs 122 of the positive electrode 12 are disposed at the other side (i.e., the right side of FIG. 4) while having the distance D in the same end (i.e., the upper end of FIG. 4) of the spiral-wound electrode assembly 10.

The uncoated region tabs 112 and 122 are provided for every spiral winding of the electrode assembly 10 to enable a charge/discharge current to flow, and accordingly, the entire resistance of the uncoated region tabs 112 and 122 is reduced. Thus, the electrode assembly 10 may charge and discharge a high-capacity current through the uncoated region tabs 112 and 122.

In the first exemplary embodiment, the electrode assembly 10 is formed of two assemblies. Although it is not illustrated, the electrode assembly may be formed of three or four assemblies. That is, the electrode assembly 10 includes a first assembly 101 and a second assembly 102 that are disposed in parallel with each other in a width direction (i.e., x-axis direction).

In addition, the first and second assemblies 101 and 102 may each be formed in the shape of a plate that forms a semicircle at opposite ends in the y-axis direction such that they can be received in the case 30 having the rectangular parallelepiped shape.

Figure 5:
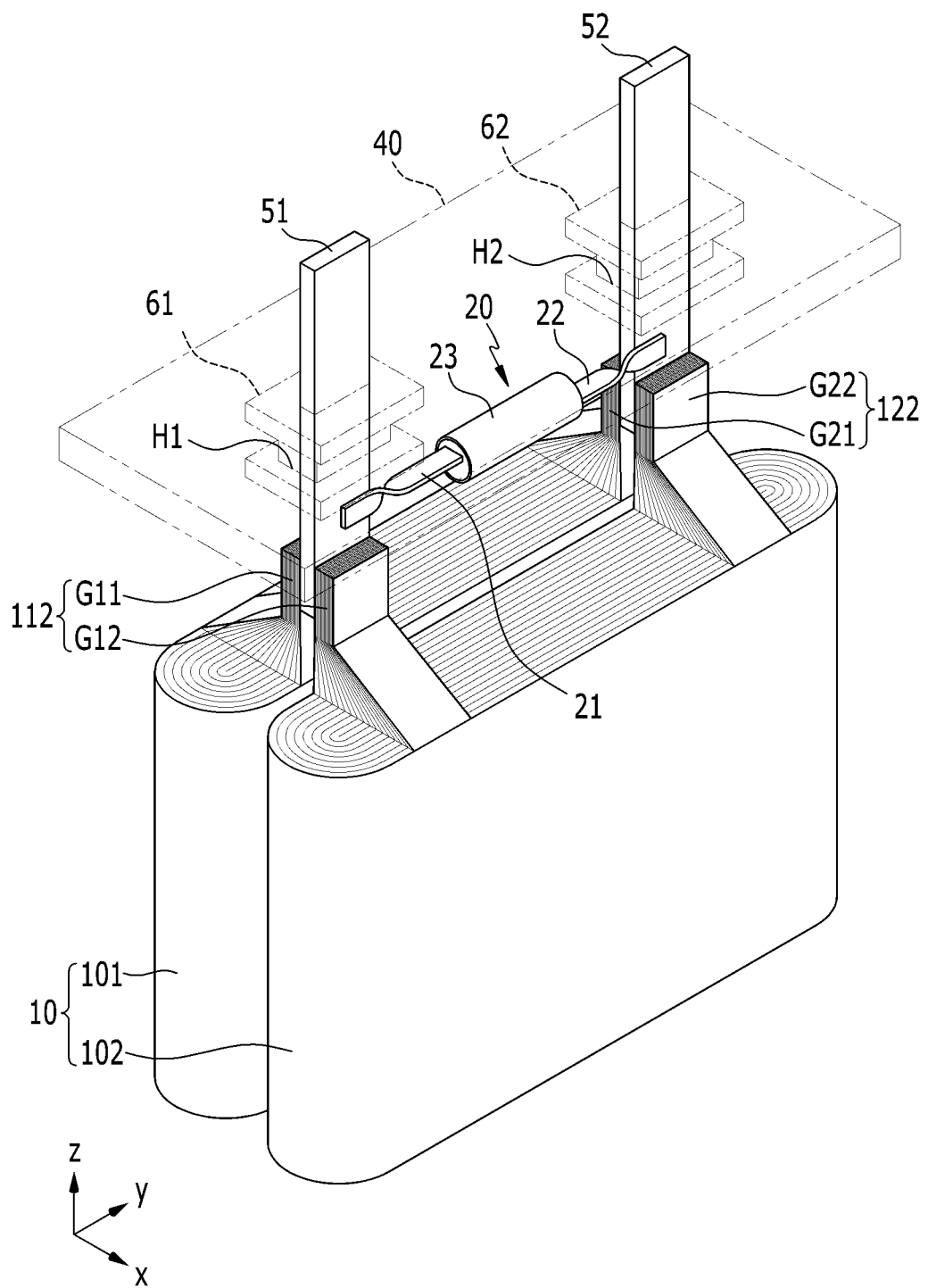
FIG. 5 is a perspective view in a state that an electrode terminal and an overcharge safety device are connected to the electrode assembly of FIG. 4.

FIG. 5 is a perspective view of a state in which the electrode terminals and the overcharge safety device are connected to the electrode assembly of FIG. 4. Referring to FIG. 3 to FIG. 5, the electrode assembly 10, that is, the first and second assemblies 101 and 102, are electrically connected in parallel by being arranged side by side.

For example, the first and second electrode terminals 51 and 52 are respectively provided in the terminal holes H1 and H2 of the cap plate 40 by using an insert molding method. Thus, the first and second electrode terminals 51 and 52 are electrically connected with the uncoated region tabs 112 and 122 while being electrically insulated from the cap plate 40 by molding resin members 61 and 62 (refer to FIGS. 1, 2, 3, and 5).

That is, the uncoated region tabs 112 and 122 connect the first and second assemblies 101 and 102 to the first and second electrode terminals 51 and 52. For example, the uncoated region tabs 112 and 122 may be formed of a plurality of groups.

The uncoated region tabs 112 and 122 form areas that are set in a direction in which a plane (i.e., a y-z plane) of the electrode 10 extends, while disposing the first and second electrode terminals 51 and 52 therebetween in the width direction (i.e., the x-axis direction) of the cap plate 40, and then bonded to side surfaces of the first and second electrode assemblies 51 and 52.

In this case, the first and second electrode terminals 51 and 52 form areas that correspond to the areas of the uncoated region tabs 112 and 122 such that the first and second electrode terminals 51 and 52 are plane-bonded with the uncoated region tabs 112 and 122. For example, the first and second electrode terminals 51 and 52 extend while having widths that correspond to widths of the uncoated region tabs 112 and 122, and may be ultrasonic-welded to the uncoated region tabs 112 and 122.

In the first exemplary embodiment, the uncoated region tabs 112 and 122 include first tab groups G11 and G21 and second tab groups G12 and G22. The first tab groups G11 and G21 are respectively connected to the negative and positive electrodes 11 and 12 of the first assembly 101 and thus connected to the first and second electrode terminals 51 and 52, and the second tab groups G12 and G22 are respectively connected to the negative and positive electrodes 11 and 12 of the second electrode assembly 102 and thus connected to the first and second electrode terminals 51 and 52.

Figure 6:
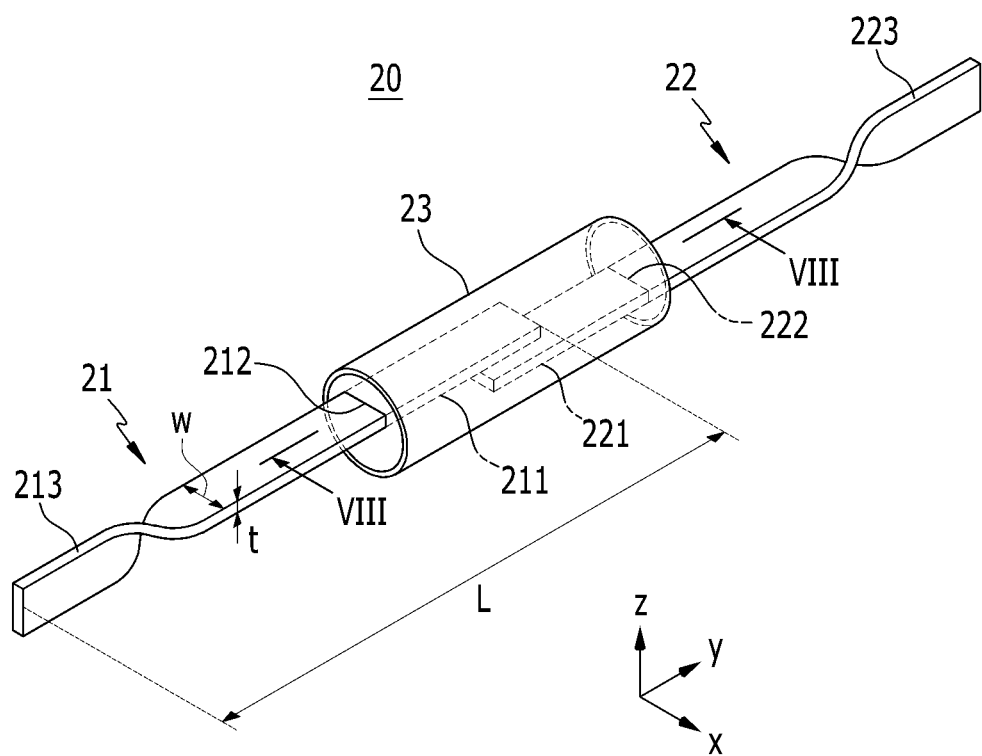
FIG. 6 is a perspective view of an overcharge safety device applied to FIG. 5.

FIG. 6 is a perspective view of the overcharge safety device applied to FIG. 5. Referring to FIG. 2, FIG. 3, FIG. 5, and FIG. 6, the overcharge safety device 20 includes a first short-circuit member 21 and a second short-circuit member 22 that are connected to the first electrode terminal 51 and the second electrode terminal 52 in the cap plate 40, and a tube 23 that receives a first free end 211 and a second free end 221 that are respectively formed at one end of each of the first and second short-circuit members 21 and 22.

When cells are normally operated, the first free end 211 and the second free end 221 maintain a separated state in the tube 23. Upon overcharge, the internal pressure and an internal temperature are increased and thus the tube 23 contracts such that the first free end 211 and the second free end 221 in the separated state contact each other (i.e., are electrically short-circuited) in the tube 23.

Figure 7:
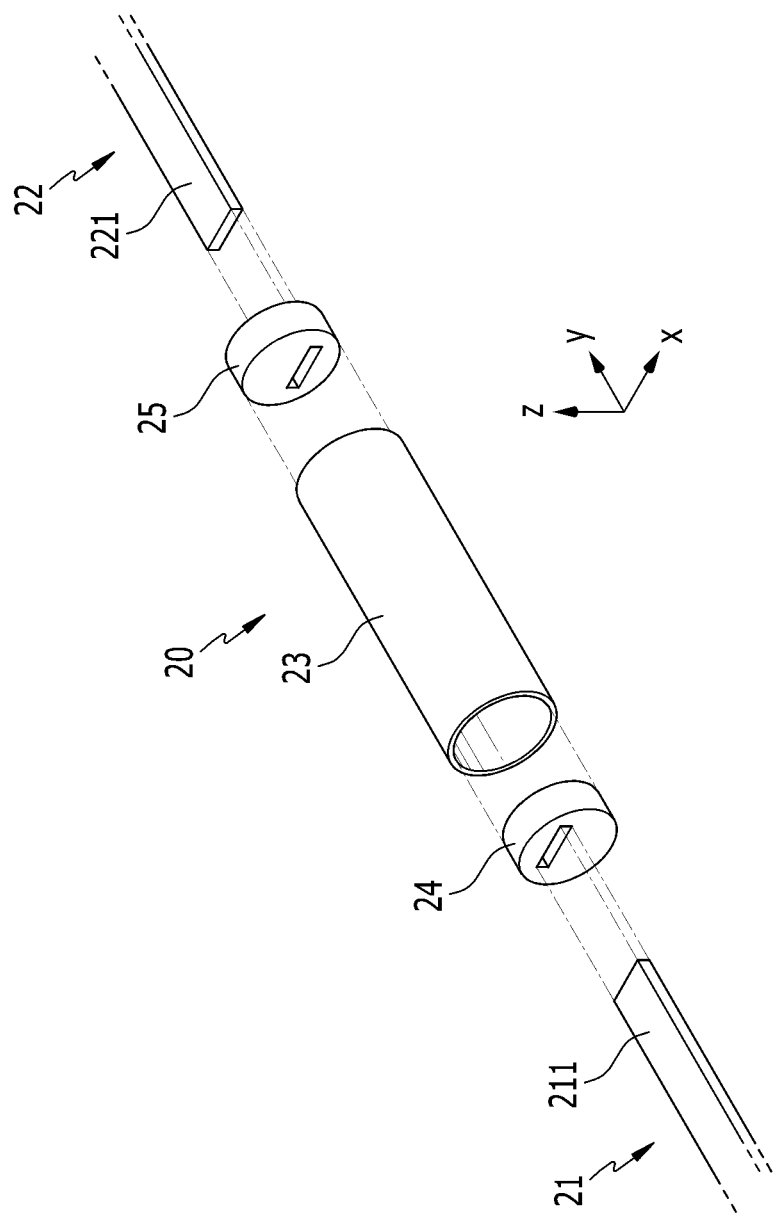
FIG. 7 is an exploded perspective view of the overcharge safety device of FIG. 6.
Figure 8:
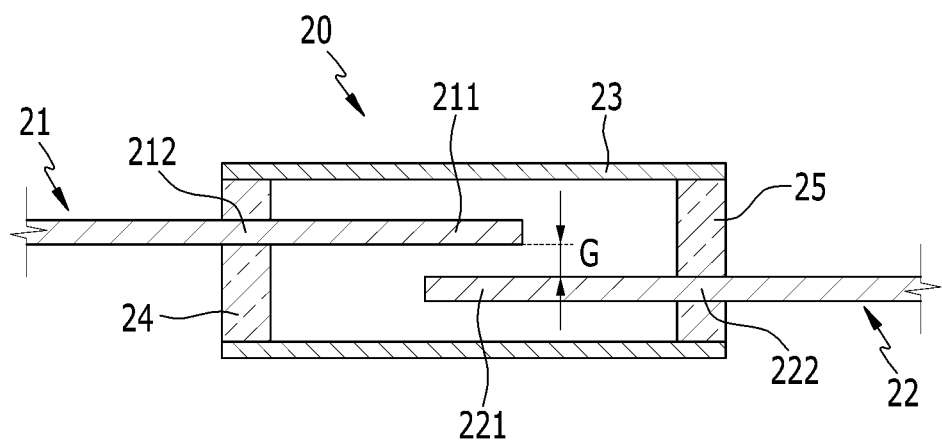
FIG. 8 is a cross-sectional view of FIG. 6, taken along the line VIII-VIII.

FIG. 7 is an exploded perspective view of the overcharge safety device of FIG. 6, and FIG. 8 is a cross-sectional view of FIG. 6, taken along the line VIII-VIII. Referring to FIG. 6 to FIG. 8, the overcharge safety device 20 further includes holders 24 and 25 that are combined to opposite ends of the tube 23 to fix and seal the first and second short-circuit members 21 and 22 that extend toward the inside of the tube 23.

The holders 24 and 25 fix and seal first and second fixing portions 212 and 222 of the first and second short-circuit members 21 and 22 at predetermined locations from the first and second free ends 211 and 221. That is, portions of the first and second short-circuit members 21 and 22, contacting the holders 24 and 25, are referred to as the first and second fixing portions 212 and 222.

The first and second short-circuit members 21 and 22 respectively have predetermined widths W, thicknesses t, and lengths L. The first and second short-circuit members 21 and 22 having the width W that is larger than the thickness t are bent between the holder 24 and the first electrode terminal 51 and between the holder 25 and the second electrode terminal 52, and are connected to the first and second electrode terminals 51 and 52 through wide areas of first and second connection end portions 213 and 223.

The first and second free ends 211 and 221 are disposed, while opposing each other with a gap G therebetween, in a direction (i.e., z-axis direction) that crosses a plane of the cap plate 40 in the case 30, and the first and second connection end portions 213 and 223 are connected to the first and second electrode terminal 51 and 52 in a manner of surface-contact in a width direction (i.e., x-axis direction) of the cap plate 40.

The first and second free ends 211 and 221 are activated upon overcharge and surface-contact with each other with the width W, and the width W is the same size as fixed widths of the first and second fixing portions 212 and 222 that are fixed to the holders 24 and 25. That is, the first and second short-circuit members 21 and 22 have the same width W and the same thickness t.

Figure 9:
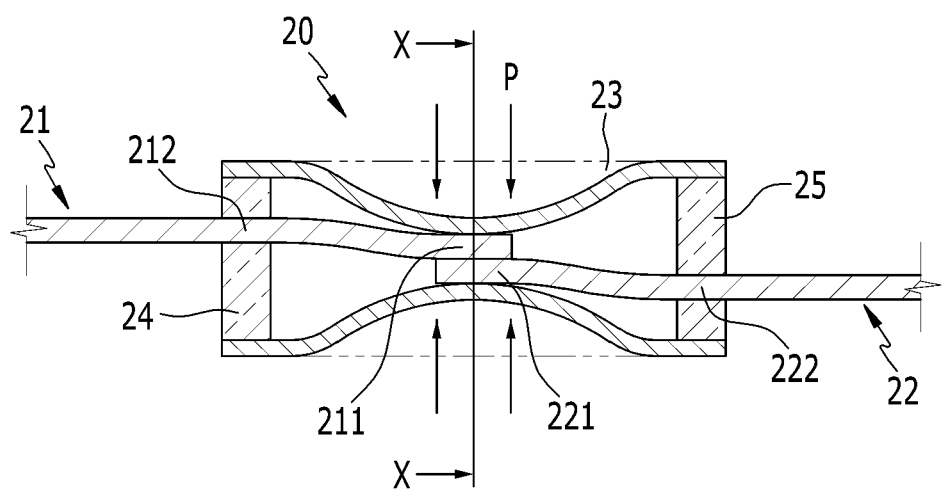
FIG. 9 is a cross-sectional view of an overcharge safety device of FIG. 8, in an activated state.
Figure 10:
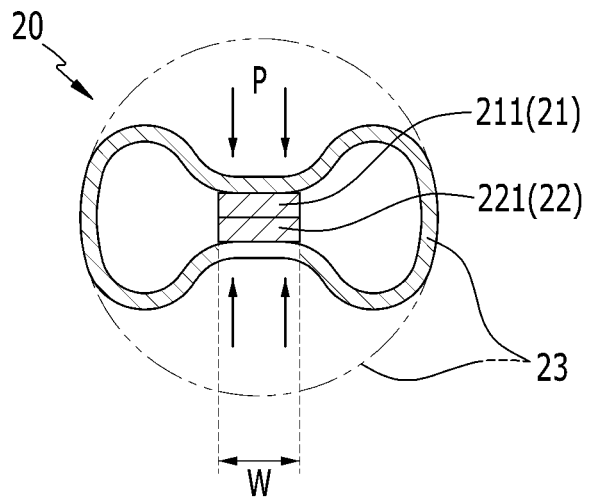
FIG. 10 is a cross-sectional view of FIG. 9, taken along the line X-X.

FIG. 9 is a cross-sectional view of the overcharge safety device of FIG. 8, in an activated state, and FIG. 10 is a cross-sectional view of FIG. 9, taken along the line X-X. Referring to FIG. 9 and FIG. 10, the tube 23 is formed of a chemical resistant material which is not damaged by the electrolyte solution. In addition, the tube 23 excludes the electrolyte solution, and maintains a low pressure that is lower than atmospheric pressure or maintains a vacuum state, to thereby allow the first and second short-circuit members 21 and 22 to be smoothly bent and enable contact operation.

For example, the tube 23 may be provided as a compression tube. The compression tube may contract with an internal pressure increase P due to the gas generated from the internal space formed by the cap plate 40 and the case 30. The first free end 211 and the second free end 221 are pressed in the compression tube, which is the tube 23, by contraction of the tube 23 and thus they may contact each other.

In this case, the tube 23 presses top and bottom surfaces of the first and second free ends 211 and 221, which are formed flat and have the width W, while being bent to have a curved surface according to the internal pressure increase P such that the opposite surfaces of the first and second free ends 211 and 221 surface-contact each other at a center of the tube 23.

Upon overcharging, according to the contact of the first and second free ends 211 and 221, the first and second electrode terminals 51 and 52 connected to the first and second short-circuit members 21 and 22 and the negative and positive electrodes 11 and 12 of the electrode assembly 10 are short-circuited. Accordingly, a current charged in the electrode assembly 10 is discharged.

The second electrode terminal 52 further includes a fuse F formed between the uncoated region tab 122 and the second short-circuit member 22. The second electrode terminal 52 is connected to the uncoated region tab 122 of the positive electrode 12 through an inner end thereof, and is connected to the second short-circuit member 22 at an upper portion of the uncoated region tab 122. Although it is not illustrated, the fuse may be provided in the first electrode terminal, or in the first and second electrode terminals.

Thus, upon overcharging, the high-capacity current charged in the electrode assembly 10 is discharged while the first free end 221 and the second free end 221 contact each other, and resistance is increased and high heat is generated in a discharge line, thereby activating the fuse F. As the fuse F is activated, the positive electrode 12 of the electrode assembly 10 and the second electrode terminal 52 are electrically disconnected.

Since the overcharge safety device 20 is manufactured separately from other parts of the cell and is mounted inside the cell, the overcharge safety device 20 is not affected by the manufacturing process of the cell and does not have operating scatter when the cell is overcharged. Thus, the overcharge safety device 20 can safely block a current of the cell without causing quality scatter in the rechargeable battery.

As another example, the tube 23 may be provided as a heat-shrink tube. When the cell is overcharged, the heat-shrink tube may contract due to an internal heat increase generated from the internal space formed by the cap plate 40 and the case 30. According to the contraction of the heat-shrink tube, that is, the tube 23, the first free end 211, and the second free end 221 are pressed and thus contact each other in the tube 23.

As another example, the tube 23 may be provided as a compression/heating tube. The compression/heat-shrink tube may contract due to an internal pressure increase and an internal heat increase caused by a gas generated from an inner space set by the cap plate 40 and the case 30 upon discharge. According to the compression/heat contraction of the compress/heating tube, that is, the tube 23, the first free end 211 and the second free end 221 may be pressed and thus contact each other in the tube 23.

Hereinafter, various exemplary embodiments of the present invention will be described. For convenience of description, description of the same configurations will be omitted and different configurations will be described in comparison with the first and the previously described exemplary embodiments.

Figure 11:
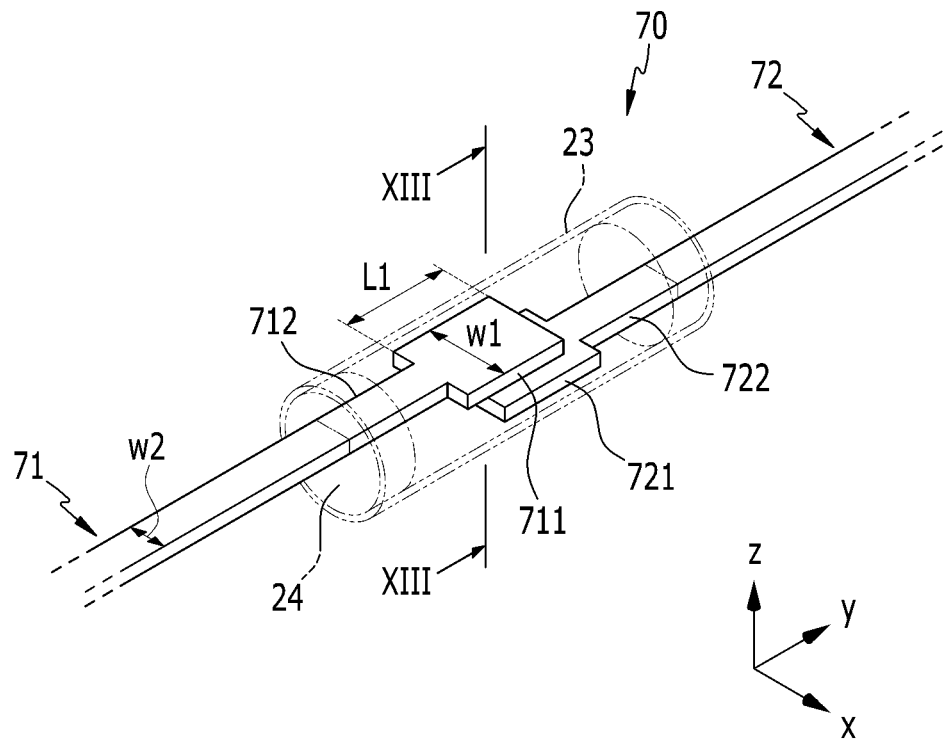
FIG. 11 is a perspective view of an overcharge safety device applied to a rechargeable battery according to a second exemplary embodiment.
Figure 12:
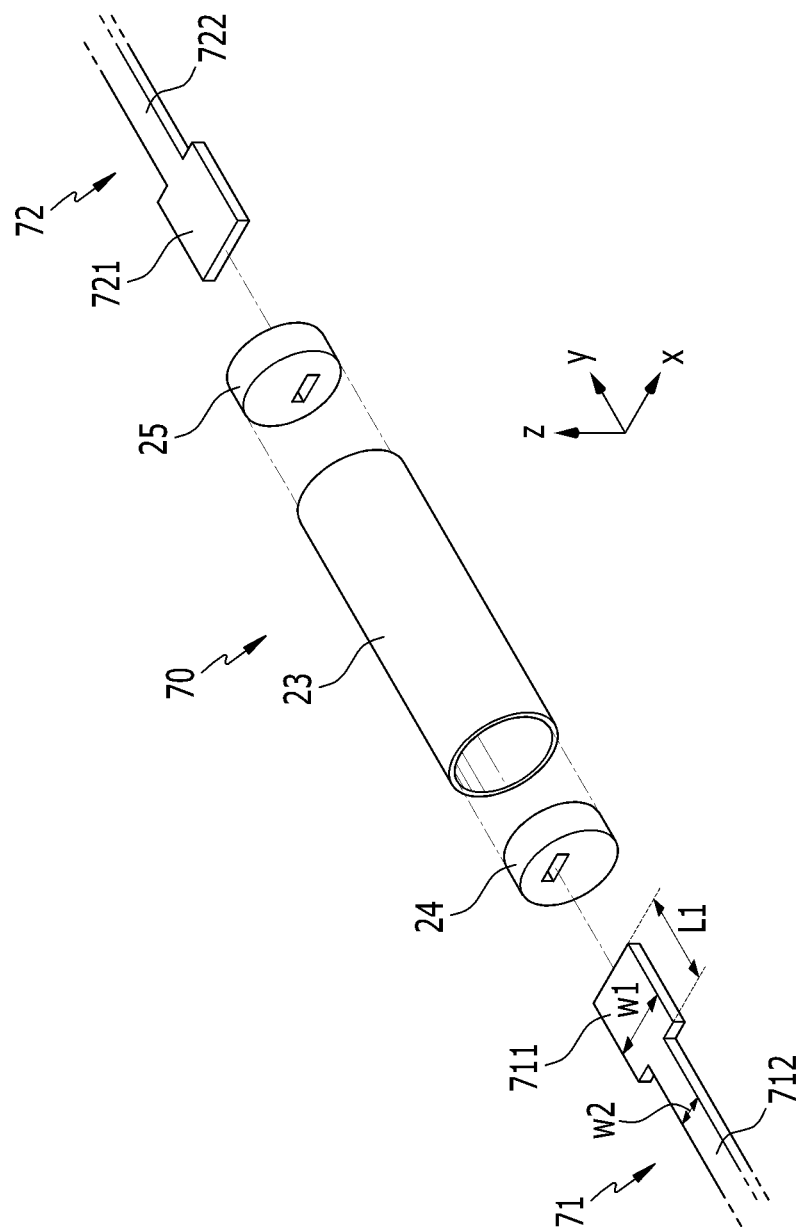
FIG. 12 is an exploded perspective view of the overcharge safety device of FIG. 11.
Figure 13:
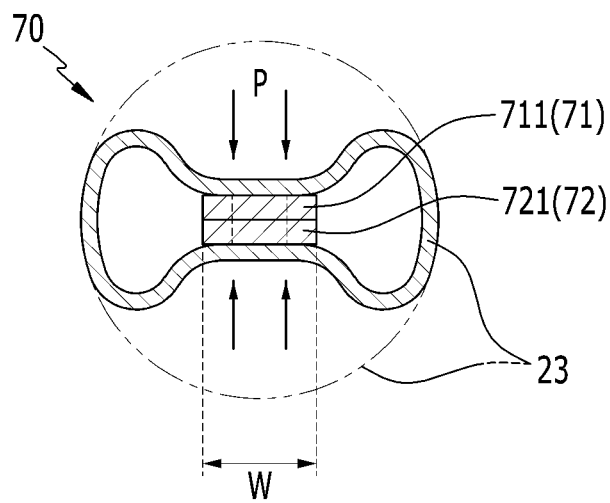
FIG. 13 is a cross-sectional view of FIG. 11, taken along the line XIII-XIII.

FIG. 11 is a perspective view of an overcharge safety device applied to a rechargeable battery according to a second exemplary embodiment, FIG. 12 is an exploded perspective view of the overcharge safety device of FIG. 11, and FIG. 13 is a cross-sectional view of FIG. 11, taken along the line XIII-XIII.

Referring to FIG. 11 to FIG. 13, in an overcharge safety device 70 applied to the rechargeable battery of the second exemplary embodiment, first and second free ends 711 and 721 of first and second short-circuit members 71 and 72 have first widths W1, which surface-contact each other when activated upon overcharge.

The first width W1 is larger than a second width W2 of first and second fixing portions 712 and 722 that are fixed to holders 24 and 25. That is, the first free end 711 and the second free end 722 of the first short-circuit member 71 and the second short-circuit member 72 are formed with wider widths (i.e., W1>W2) than the first fixing portion 712 and the second fixing portion 722.

A tube 23 presses top and bottom surfaces of the first and second free ends 711 and 721 having the first width W while being bent as an internal pressure P is increased, such that opposite surfaces of the first and second free ends 711 and 721 contact each other at a center of the tube 23. That is, the first free end 711 and the second free end 721 surface-contact each other with an area having a predetermined length L1 and the first width W1.

That is, the first and second fixing portions 712 and 722 of the first and second short-circuit members 71 and 72 are fixed to the holders 24 and 25 with the second width W2. When the second width W2 is the same as the width W of the first exemplary embodiment, the first and second free ends 711 and 721 of the second exemplary embodiment form a larger contact area than the contact area of the first and second free ends 211 and 221 of the first exemplary embodiment.

That is, compared to the contact resistance of the first and second free ends 221 and 221 of the first exemplary embodiment, contact-resistance of the first and second free ends 711 and 721 of the second exemplary embodiment may be further reduced. Thus, a high-capacity current charged in the electrode assembly 10 may be more easily discharged compared to the first exemplary embodiment, and thus a fuse can be activated.

Figure 14:
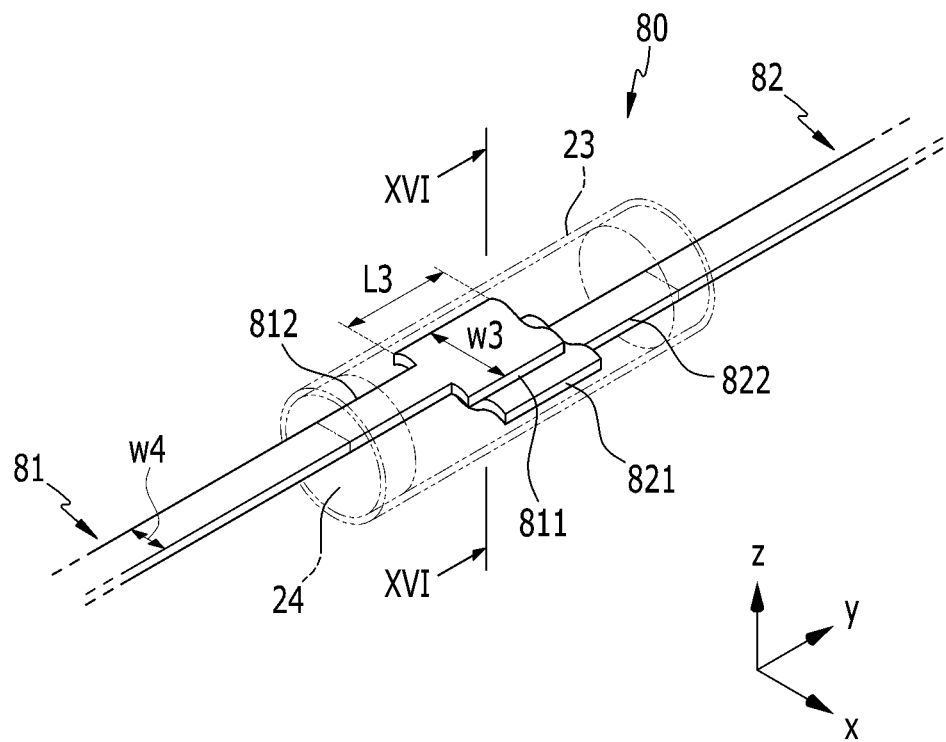
FIG. 14 is a perspective view of an overcharge safety device applied to a rechargeable battery according to a third exemplary embodiment of the present invention.
Figure 15:
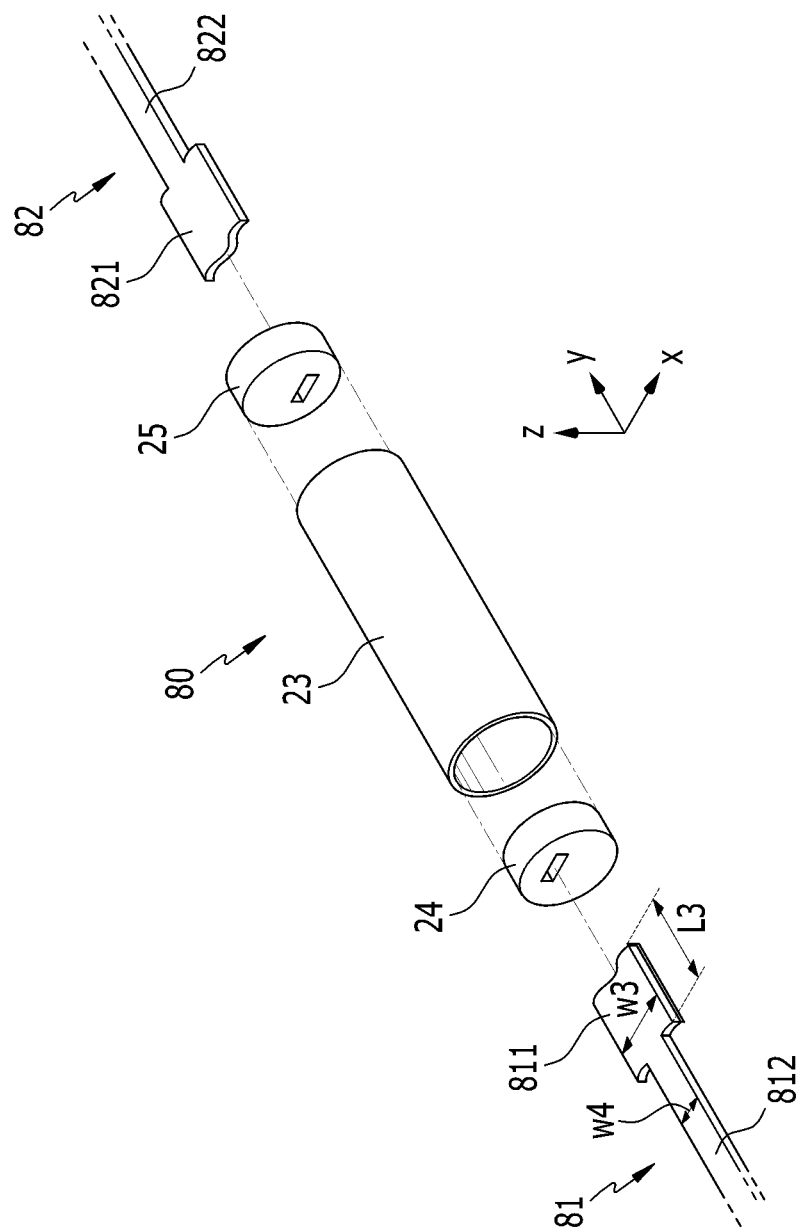
FIG. 15 is an exploded perspective view of the overcharge safety device of FIG. 14.
Figure 16:
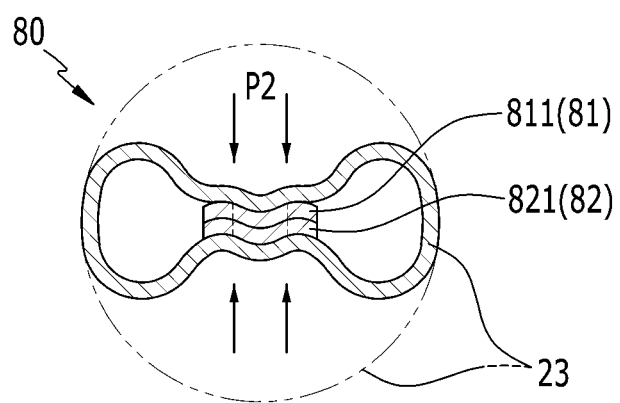
FIG. 16 is a cross-sectional view of FIG. 14, taken along the line XVI-XVI.

FIG. 14 is a perspective view of an overcharge safety device applied to a rechargeable battery according to a third exemplary embodiment of the present invention, FIG. 15 is an exploded perspective view of the overcharge safety device of FIG. 14, and FIG. 16 is a cross-sectional view of FIG. 14, taken along the line XVI-XVI.

Referring to FIG. 14 to FIG. 16, in an overcharge safety device 80 applied to a rechargeable battery of the third exemplary embodiment, first and second free ends 811 and 821 of first and second short-circuit members 81 and 82 have first widths W3, which curve-contact each other when activated upon overcharge. The first and second free ends 811 and 821 are in curved contact with an area set by a predetermined length and the first width W3. First and second fixing portions 812 and 822 are connected to the first and second curved free ends 811 and 821 in a planar manner, and are fixed to holders 24 and 25 with a second width W4.

A tube 23 presses top and bottom surfaces of the first and second free ends 811 and 821 formed with curves and having the first width W3 while being bent as an internal pressure P is increased, such that opposite surfaces of the first and second free ends 811 and 821 contact each other at a center of the tube 23.

That is, the tube 23 effectively presses (P2) external surfaces of the curved first and second free ends 811 and 821. The effective pressure (P2) enables the first and second free ends 811 and 821 to surface-contact each other with an area having a predetermined length L3 and the first width W3.

That is, the first and second fixing portions 812 and 822 of the first and second short-circuit members 81 and 82 are fixed to holders 24 and 25. When the second width W4 is the same as the second width W2 of the second exemplary embodiment, the first and second free ends 811 and 821 of the third exemplary embodiment form a larger contact area than the contact area of the first and second free ends 711 and 721 of the second exemplary embodiment.

That is, contact resistance of the first and second free ends 811 and 821 of the third exemplary embodiment may be further reduced when compared to contact resistance of the first and second free ends 711 and 721 of the second exemplary embodiment. Accordingly, a high-capacity current charged in the electrode assembly 10 can be more easily discharged than in the second exemplary embodiment, and a fuse can be activated.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

-Description of symbols-

| | |
|---|---|
| 10: electrode assembly | 11: first electrode (negative electrode) |
| 12: second electrode (positive electrode) | 13: separator |
| 20, 70, 80: overcharge safety device | |
| 21, 71, 81: first short-circuit member | |
| 22, 72, 82: second short-circuit member | 23: tube |
| 24, 25: holder | 30: case |
| 31: opening | 40: cap plate |
| 41: vent hole | 42: electrolyte injection opening |
| 51, 52: first, second electrode terminal | |
| 61, 62: molding resin member | |
| 101, 102: first, second assembly | 111, 121: coated region |
| 112, 122: uncoated region tab | 211, 711, 811: first free end |
| 212, 712, 812: first fixing portion | |
| 213, 223: first, second connection end portion | |
| 221, 721, 821: second free end | |
| 222, 722, 822: second fixing portion | |
| 411: vent plate | 412: notch |
| 421: sealing cap | D: distance |
| F: fuse | G: gap |
| G11, G21: first tab group | G12, G22: second tab group |
| H1, H2: terminal hole | L, L1, L3: length |
| P: internal pressure increase, pressure | t: thickness |
| W: width | W1, W3: first width |
| W2, W4: second width | WD: one spiral-winding range |

The invention claimed is:

1. A rechargeable battery comprising:
an electrode assembly comprising a first electrode and a second electrode at opposite sides of a separator;
a case in which the electrode assembly is accommodated;
a cap plate that is combined with an opening of the case;
a first electrode terminal and a second electrode terminal that are provided in terminal holes of the cap plate and respectively connected to the first electrode and the second electrode; and
an overcharge safety device comprising a first short-circuit member having a first free end, a second short-circuit member having a second free end and a tube, wherein the first short-circuit member is connected to the first electrode terminal and the second short-circuit member is connected to the second electrode terminal, and
wherein the first free end and the second free end are spaced apart from each other and are received in the tube.

2. The rechargeable battery of claim 1, wherein the first and second short-circuit members comprise a first and second fixing portion, respectively, and wherein the first fixing portion is located along the first short-circuit member at a distance from the first free end and the second fixing portion is located along the second short-circuit member at a distance from the second free end, and wherein the overcharge safety device further comprises holders that contact the first and second fixing portions to seal opposite ends of the tube.

3. The rechargeable battery of claim 2, wherein the tube is provided as a compression tube that contracts by an internal pressure increase due to a gas generated from an internal space set by the cap plate and the case upon overcharge such that the first free end and the second free end contact each other.

4. The rechargeable battery of claim 2, wherein the tube is provided as a heat-shrink tube that contracts by an internal heat increase generated from an internal space set by the cap plate and the case upon overcharge such that the first free end and the second free end contact each other.

5. The rechargeable battery of claim 2, wherein the tube is provided as a compression/heat-shrink tube that contracts by an internal pressure increase and an internal heat increase due to a gas generated from an internal space set by the cap plate and the case upon overcharge such that the first free end and the second free end contact each other.

6. The rechargeable battery of claim 2, wherein the first short-circuit member and the second short-circuit member extend to a predetermined length with a width and a thickness.

7. The rechargeable battery of claim 6, wherein the holders comprise a first holder between the first free end and the first electrode terminal and a second holder between the second free end and the second electrode terminal, and the first short-circuit member and the second short-circuit member are bent between the first holder and the first electrode terminal and between the second holder and the second electrode terminal, respectively, and are connected to the first electrode terminal and the second electrode terminal through a wide area of a first connection end portion and a wide area of a second connection end portion, respectively.

8. The rechargeable battery of claim 7, wherein the first free end and the second free end are opposing each other at a distance from each other in a direction that crosses a plane of the cap plate in the case, and the first connection end portion and the second connection end portion are connected with the first electrode terminal and the second electrode terminal, respectively, in a surface-contact manner in a width direction of the cap plate in the case.

9. The rechargeable battery of claim 6, wherein the first free end and the second free end that are activated upon overcharge and surface-contact to each other have the same width as a fixing width of the first fixing portion and a fixing width of the second fixing portion that are fixed to the holders.

10. The rechargeable battery of claim 2, wherein the first free end and the second free end that are activated upon overcharge and surface-contact to each other have a first width that is larger than a second width of the first fixing portion and the second fixing portion fixed to the holders.

11. The rechargeable battery of claim 10, wherein the first free end and the second free end surface-contact each other with an area having a predetermined length and the first width.

12. The rechargeable battery of claim 11, wherein the first fixing portion and the second fixing portion are fixed to the holders at the second width.

13. The rechargeable battery of claim 10, wherein the first free end and the second free end curve-contact each other with an area having a predetermined length and the first width.

14. The rechargeable battery of claim 13, wherein the first fixing portion and the second fixing portion are fixed to the holders at the second width and extend in the same plane as the first free end and the second free end, respectively, and wherein the first free end and the second free end are curved along the first width.

15. The rechargeable battery of claim 1, wherein the second electrode terminal is connected to an uncoated region tab of the second electrode through an inner side end thereof and is connected to the second short-circuit member at an upper portion of the uncoated region tab, and the second electrode terminal further comprises a fuse that is formed between the uncoated region tab and the second short-circuit member.

* * * * *